US008449386B2

(12) United States Patent
Englman et al.

(10) Patent No.: US 8,449,386 B2
(45) Date of Patent: May 28, 2013

(54) GAMING SYSTEM HAVING BONUS AWARDS ENTERED INTO TOURNAMENT FEATURES

(75) Inventors: Allon G. Englman, Chicago, IL (US); Jamie W. Vann, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 289 days.

(21) Appl. No.: 12/616,949

(22) Filed: Nov. 12, 2009

(65) Prior Publication Data

US 2010/0120522 A1 May 13, 2010

Related U.S. Application Data

(60) Provisional application No. 61/199,075, filed on Nov. 13, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/26; 463/16; 463/20; 463/25; 463/42

(58) Field of Classification Search
USPC ................................... 463/16, 20, 25, 26, 42
See application file for complete search history.

(56) References Cited

U.S. PATENT DOCUMENTS

| | | | | |
|---|---|---|---|---|
| 5,083,271 | A | 1/1992 | Thacher et al. | |
| 5,711,715 | A | 1/1998 | Ringo et al. | |
| 5,755,621 | A | 5/1998 | Marks et al. | |
| 5,779,242 | A | 7/1998 | Kaufmann | |
| 5,779,549 | A | 7/1998 | Walker et al. | |
| 6,039,648 | A | 3/2000 | Guinn et al. | |
| 6,093,100 | A | 7/2000 | Singer et al. | |
| 6,224,486 | B1 | 5/2001 | Walker et al. | |
| 6,287,202 | B1 | 9/2001 | Pascal et al. | |
| 6,293,865 | B1 | 9/2001 | Kelly et al. | |
| 6,309,299 | B1 | 10/2001 | Weiss | |
| 6,315,668 | B1 | 11/2001 | Metke et al. | |
| 6,425,828 | B2 | 7/2002 | Walker et al. | |
| 6,817,948 | B2 | 11/2004 | Pascal et al. | |
| 6,908,390 | B2 | 6/2005 | Nguyen et al. | |
| 2002/0010025 | A1 | 1/2002 | Kelly et al. | |
| 2002/0028707 | A1* | 3/2002 | Pascal et al. | 463/42 |
| 2002/0039923 | A1 | 4/2002 | Cannon et al. | |

(Continued)

FOREIGN PATENT DOCUMENTS

| | | |
|---|---|---|
| WO | WO2006015442 | 2/2006 |

*Primary Examiner* — Arthur O. Hall
*Assistant Examiner* — Wei Li
(74) *Attorney, Agent, or Firm* — Nixon Peabody LLP

(57) ABSTRACT

A gaming system for executing multi-mode bonus events comprises a wager input device, a primary display for displaying a primary wagering game and a bonus event, and at least one controller. The controller is operative to (i) detect receipt of a wager from a player of the gaming terminal, (ii) in response to the occurrence of a triggering event, initiate a bonus event, (iii) detect a selection between a standard bonus mode of operation and a tournament bonus mode of operation, (iv) if the standard bonus mode is selected, execute the bonus event on the primary display and provide any awards earned therein to the player, (v) if the tournament bonus mode is selected, execute the bonus event on the primary display and generate a tournament score for the player, and (vi) enter the player's tournament score into at least one tournament.

25 Claims, 13 Drawing Sheets

U.S. PATENT DOCUMENTS

| | | | | |
|---|---|---|---|---|
| 2002/0119824 | A1 | 8/2002 | Allen | |
| 2003/0060264 | A1 | 3/2003 | Chilton et al. | |
| 2003/0186744 | A1 * | 10/2003 | Bradell | 463/42 |
| 2004/0048649 | A1 * | 3/2004 | Peterson et al. | 463/20 |
| 2004/0229700 | A1 | 11/2004 | Cannon et al. | |
| 2005/0020352 | A1 | 1/2005 | Chilton et al. | |
| 2005/0043088 | A1 | 2/2005 | Nguyen et al. | |
| 2005/0043089 | A1 | 2/2005 | Nguyen et al. | |
| 2005/0043094 | A1 | 2/2005 | Nguyen et al. | |
| 2005/0071024 | A1 | 3/2005 | Henshaw | |
| 2005/0102047 | A1 | 5/2005 | Ottofy | |
| 2005/0148380 | A1 | 7/2005 | Cannon et al. | |
| 2005/0181856 | A1 | 8/2005 | Cannon et al. | |
| 2005/0221882 | A1 | 10/2005 | Nguyen et al. | |
| 2006/0148567 | A1 * | 7/2006 | Kellerman et al. | 463/42 |
| 2007/0077994 | A1 * | 4/2007 | Betteridge | 463/42 |
| 2007/0259709 | A1 * | 11/2007 | Kelly et al. | 463/20 |
| 2007/0293293 | A1 * | 12/2007 | Baerlocher et al. | 463/16 |
| 2007/0298857 | A1 | 12/2007 | Schlottmann et al. | |
| 2009/0197665 | A1 * | 8/2009 | Christensen | 463/20 |
| 2009/0275386 | A1 * | 11/2009 | Vallejo et al. | 463/20 |

* cited by examiner

Tournament Score Derivation Table

1004

1006

| Tournament Points (1008) | Zeus (1010) | Count Money (1012) |
| --- | --- | --- |
| ▸ 0 | ▸ 0-44 | ▸ 0-20 |
| ▸ 10 | ▸ 45-94 | ▸ 21-55 |
| ▸ 20 | ▸ 95-129 | ▸ 56-140 |
| ▸ 30 | ▸ 130-361 | ▸ 141-455 |
| ▸ 40 | ▸ 362-584 | ▸ 456-670 |
| ▸ 50 | ▸ 585-948 | ▸ 671-854 |
| ▸ 60 | ▸ >949 | ▸ >855 |

FIG. 10

GAMING SYSTEM HAVING BONUS AWARDS ENTERED INTO TOURNAMENT FEATURES

CROSS-REFERENCE TO RELATED APPLICATION

This application claims the benefit of U.S. Provisional Patent Application No. 61/199,075, filed Nov. 13, 2008, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and methods for playing wagering games, and more particularly, to a gaming system having bonus awards entered into tournament features.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Therefore, there is a continuing need for gaming machine manufacturers to continuously develop new games and improved gaming enhancements that will attract frequent play through enhanced entertainment value to the player.

One way to enhance the entertainment value of game is to provide a gaming system having tournament features which may be optionally funded by bonus awards, so as to involve a player in tournament play. The present invention is directed to a gaming system having tournament features including tournament play that may be a competition amongst player's performances in bonus games or events.

SUMMARY OF THE INVENTION

According to one aspect of the present invention, a gaming system for executing multi-mode bonus events comprises a wager input device, a primary display for displaying a primary wagering game and a bonus event, and at least one controller. The controller is operative to (i) detect receipt of a wager from a player of the gaming terminal, (ii) in response to the occurrence of a triggering event, initiate a bonus event, (iii) detect a selection between a standard bonus mode of operation and a tournament bonus mode of operation, (iv) if the standard bonus mode is selected, execute the bonus event on the primary display and provide any awards earned therein to the player, (v) if the tournament bonus mode is selected, execute the bonus event on the primary display and generate a tournament score for the player, and (vi) enter the player's tournament score into at least one tournament.

According to another aspect of the invention, a method of executing a bonus-event-outcome tournament comprises receiving a wager from a player, displaying a primary wagering game, upon the occurrence of a triggering event, initiating a bonus event, and detecting a selection between a standard bonus mode of operation and a tournament bonus mode of operation. If the standard bonus mode is selected, the bonus event is executed and displayed, and any awards earned therein are provided to the player. If the tournament bonus mode is selected, the bonus event is executed and displayed and a tournament score for the player is generated. The method further comprises entering the player's tournament score into at least one tournament.

According to yet another aspect of the invention, a gaming system having bonus awards entered into tournament features comprises a wager input device, a first gaming terminal comprising a first display for displaying a first wagering game and a first bonus event, a second gaming terminal comprising at least a second display for displaying a second wagering game and a second bonus event, a tournament server in communication with the first and second gaming devices, and at least one controller. The controller is operative to (i) detect that each of the first and second gaming terminals is operating in a tournament bonus mode, (ii) activate a tournament for a predetermined time period, (iii) receive a first tournament entry comprising a first tournament score earned by a first player in the first bonus event, (iv) receive a second tournament entry comprising a second tournament score earned by a second player in the second bonus event, (v) analyze the first tournament score, the second tournament score, and any other tournament scores received to determine a finishing order and prize pool, and (vi) award to at least one player a tournament bonus award, the tournament bonus award dependent upon the at least one player's position in the finishing order.

According to yet another aspect of the invention, a method of conducting a bonus-award-entry tournament comprises identifying participants in a tournament by receiving a player identifier from each such participant, receiving from each participant in the tournament at least one wager to play a respective wagering game, and generating a tournament score for each participant comprising a total number of points earned by such player in a bonus event triggered during play of the wagering game. The method further comprises receiving each participant's tournament score, and associating each participant's tournament score with such participant's player identifier and storing both such tournament score and identifier in memory.

According to yet another aspect of the invention, a method of conducting a bonus-award-entry tournament comprises determining a number of participants in the tournament, determining a number of paid finishing positions for which a tournament bonus award will be paid, the number of paid finishing positions dependent upon the number of participants, and receiving from each participant a tournament score and a tournament fee, the tournament score earned by each such participant in a bonus event triggered during a wagering game played by such participant. The method further comprises ranking the received tournament scores to determine a finishing order including the paid finishing positions, identifying the participants in the paid finishing positions, and awarding each of the participants in the paid finishing positions a tournament bonus award.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 10 is an image of a Tournament Score Derivation Table used to determine tournament points for various credit awards paid out in a plurality of bonus games.

Figure 1A:
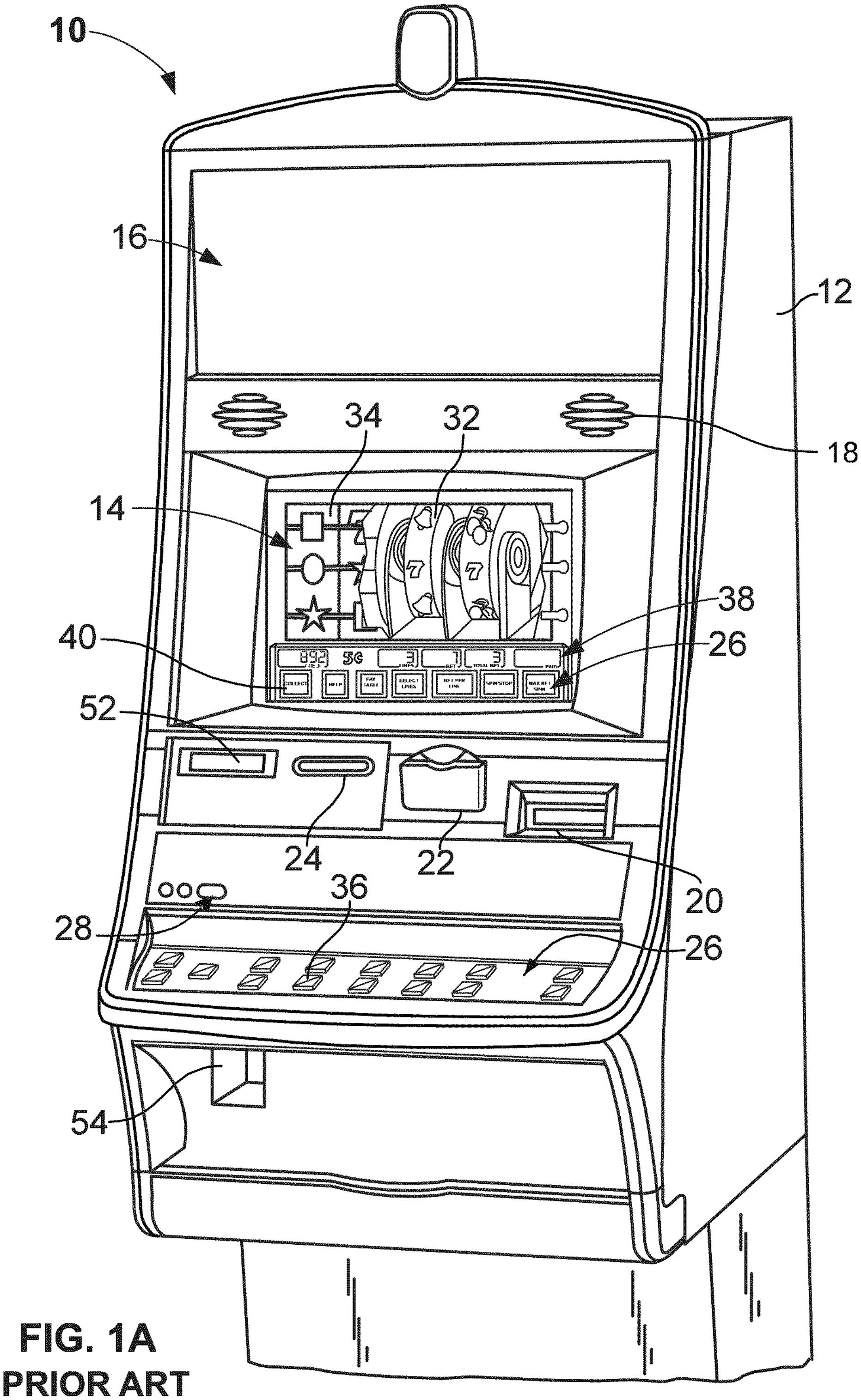
FIG. 1A PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
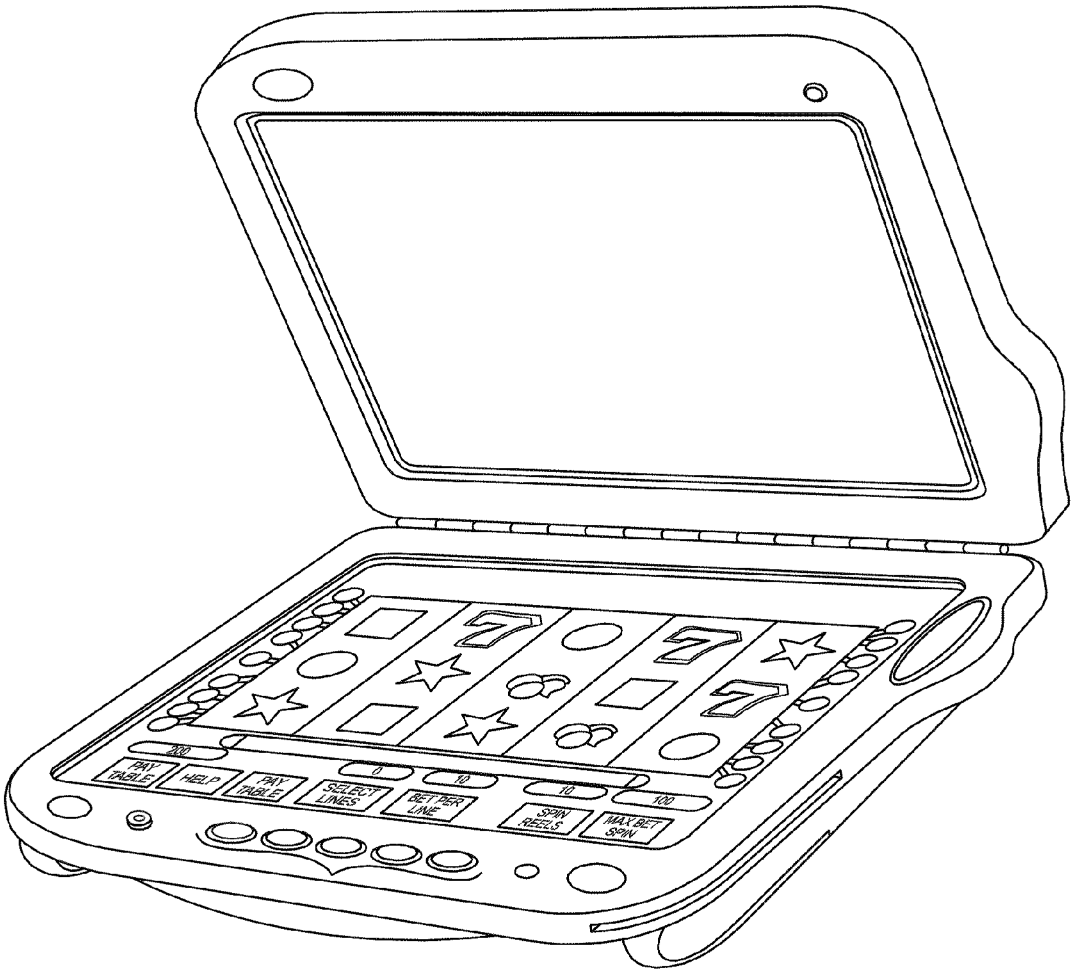
FIG. 1B PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable).

The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
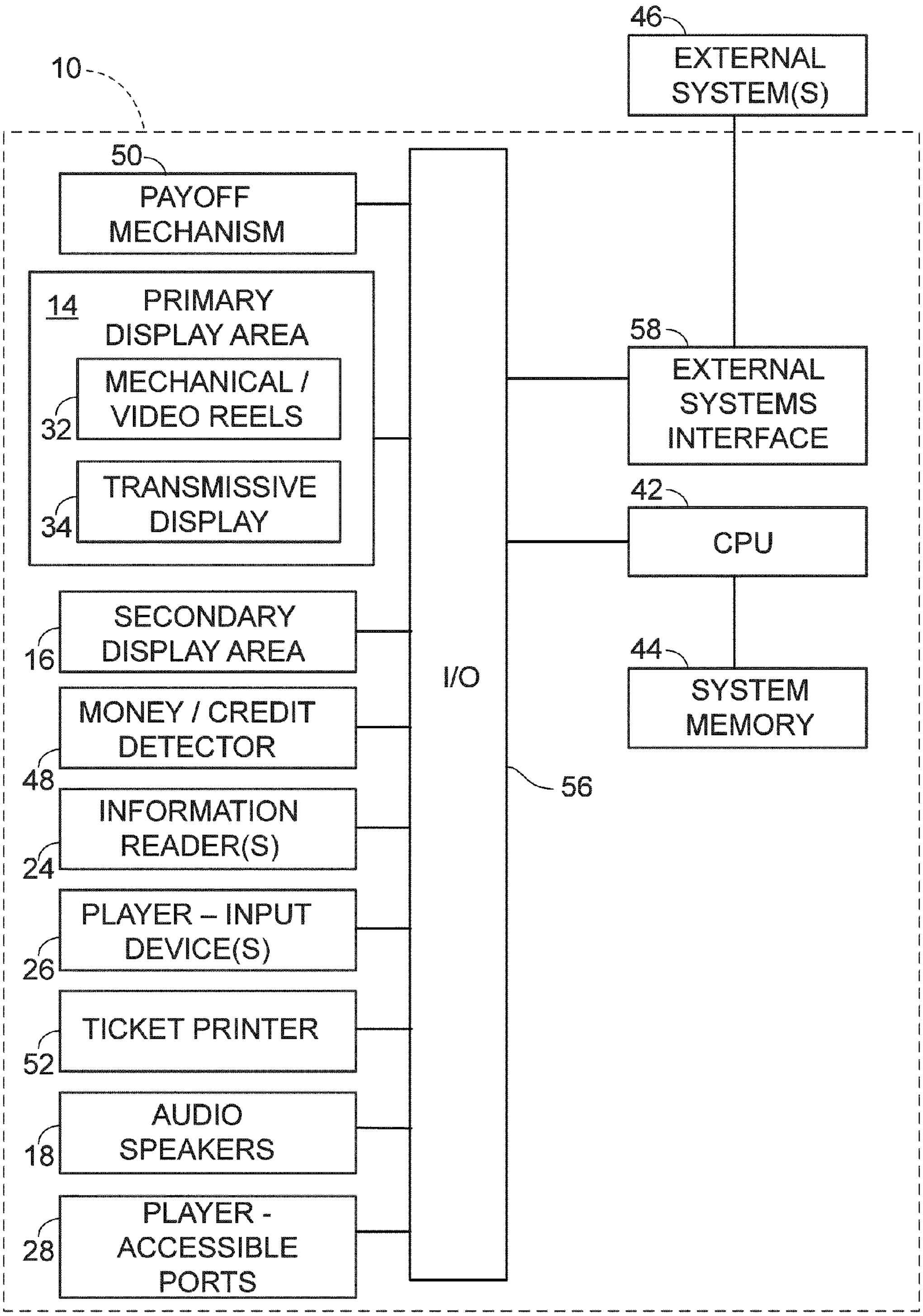
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10 bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
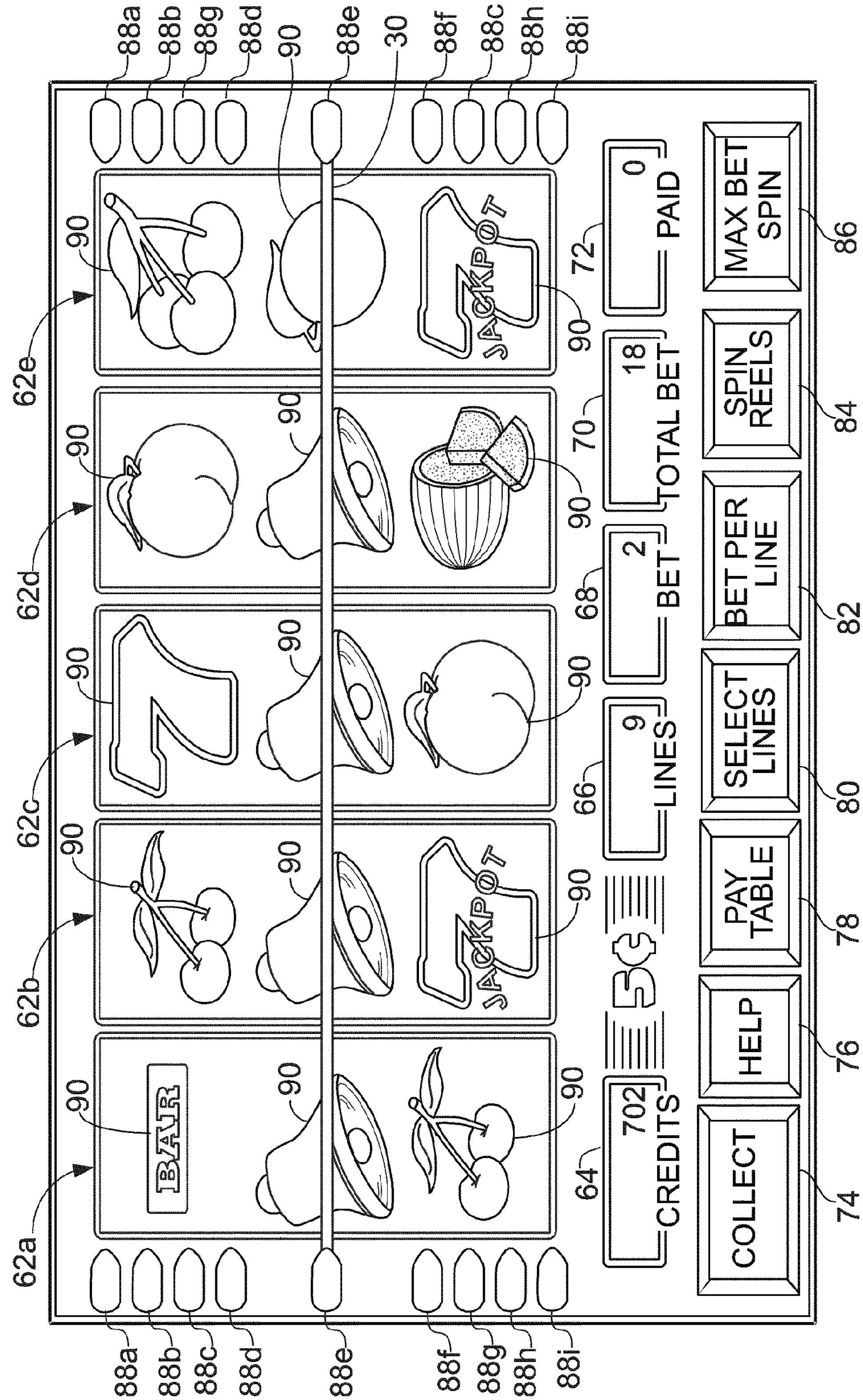
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
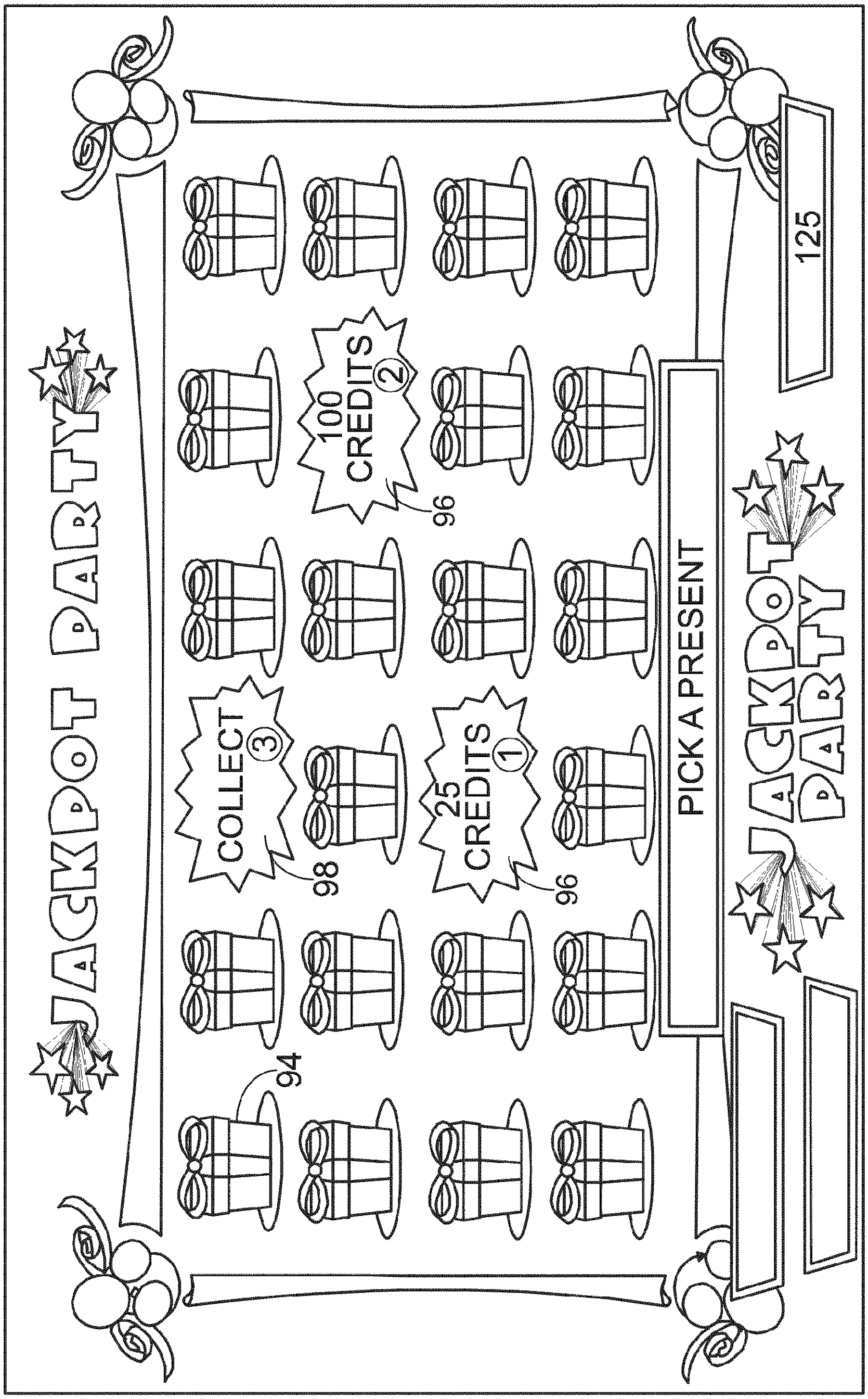
FIG.4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a standalone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
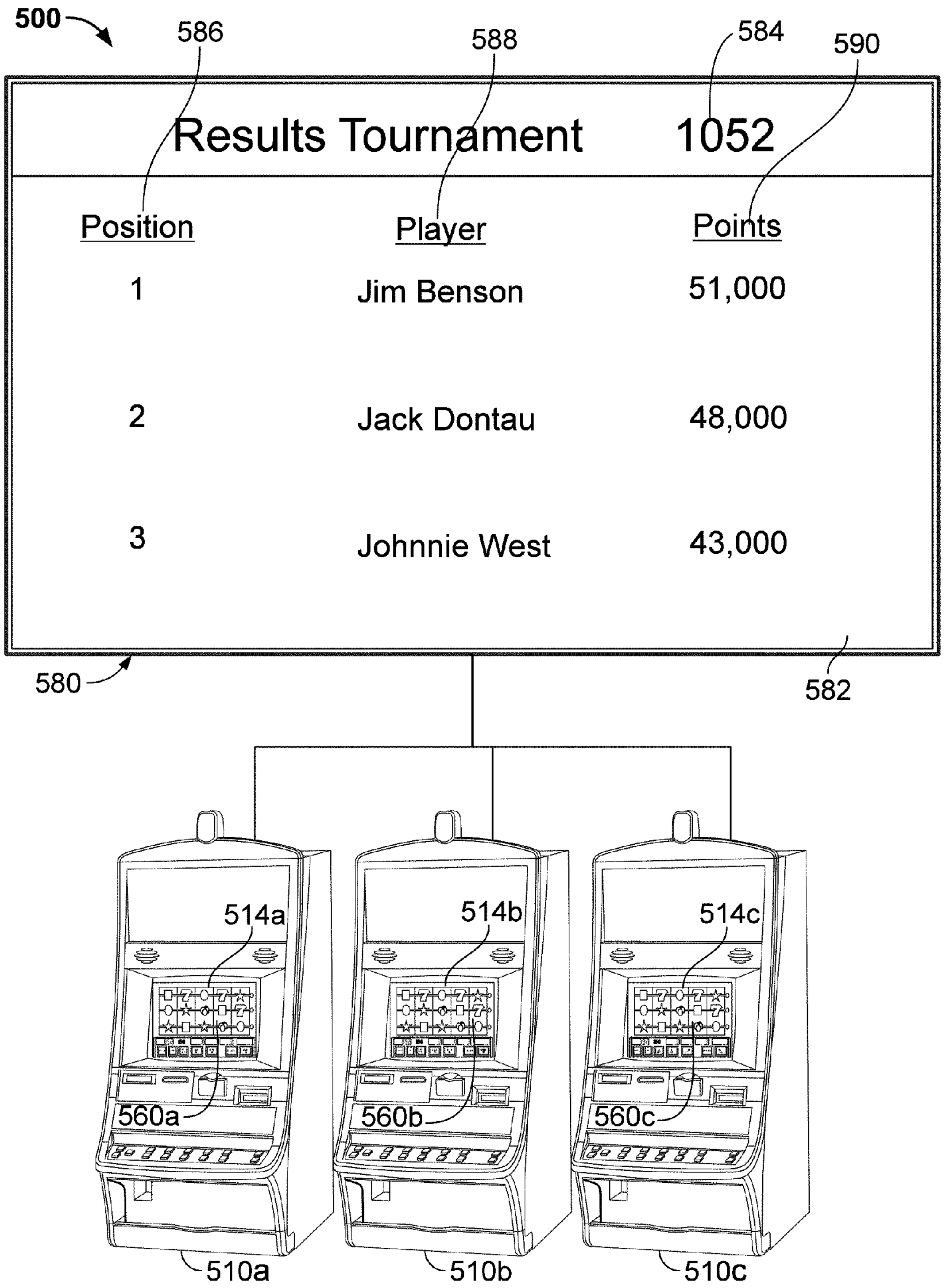
FIG. 5 is a depiction of a gaming system including a plurality of gaming terminals and a community display.

Turning to FIG. 5, a gaming system 500 including bonus awards entered into system wide tournament play features is displayed. The system 500 includes a plurality of gaming devices 510*a,b,c*, each of which include at least a primary display 514*a,b,c* for displaying game events thereon. Each of the primary displays 514*a,b,c* may be any form of display such as those described herein with reference to the free standing and handheld gaming devices of FIGS. 1*a* and 1*b*. The primary displays 514*a,b,c* may include a display of a primary wagering game 560*a,b,c*, which in this embodiment are slot games as shown in FIG. 5. The primary wagering games 560*a,b,c* may include a plurality of reels, which may be either electro-mechanical reels or simulations thereof on the primary display 514*a,b,c*. The reels may include a plurality of symbols thereon which vary as the reels are spun and stopped. The symbols may include any variety of graphical symbols, elements, or representations, including symbols which are associated with one or more themes of the gaming machines 510*a,b,c* or system 500. The symbols may also include a blank symbol, or empty space. The primary wagering games 560*a,b,c* shown on the various primary displays 514*a,b,c* of the system 500 may be the same, similar, or different in nature, game play, theme, denomination, formation, eligibility, etc.

As described herein, in some embodiments, symbols landing on the active pay lines (the pay lines for which a wager has been received) are evaluated for winning combinations. A combination of symbols that lands on an active pay line is a winning outcome for which an award may be paid in accordance with a payable of the gaming device 510*a,b,c* or system

500. The symbols on the reels form an array or matrix of symbols, having a number of rows and columns, which in the embodiment shown is three rows and five columns. In alternate embodiments, the array may have greater or fewer symbols, and may take on a variety of different forms having greater or fewer rows and/or columns. The array may even comprise other non-rectangular forms or arrangements of symbols. In alternative embodiments, other criteria may be used for winning combinations, such as symbol arrangement or configuration without regard to paylines.

The system 500 further includes a community display 580, which in this embodiment is an LCD, plasma, or other flat-screen display mounted and positioned above the plurality of gaming devices 510*a,b,c*. The community display 580 displays a tournament event 582 which includes prize and award information related to the tournament event 582 and may optionally include progress and results of one or more players participating in the tournament event 582. In the embodiment shown, the tournament event 582 comprises a plurality of players participating in an hour-long bonus tournament with the three highest finishing players receiving various awards. In alternative embodiments, the tournament event 582 may be based on other time periods, such as weekly, monthly, and daily tournaments. In some embodiments, the tournaments are funded (partially or completely) by players' results in a bonus game or secondary event, and thus players can choose to play such bonus events in either standard cash payout bonus mode (in which they do not participate in the tournament event 582) or in a tournament bonus mode (in which they do compete in one or more tournament events 582). In other embodiments, the bonus tournaments are funded solely by a tournament fee, in which player's tournament scores earned and generated in bonus events are compared and ranked in order of performance. Other configurations are possible.

The display 580, in this example, communicates information concerning results of one or more tournaments. In an embodiment, the community display 580 displays a tournament number 584, final positions 586, player names 588, and tournament award 590. In some embodiments, the tournament number 584 uniquely identifies a tournament so that a player is informed as to which tournament results are being displayed on the community display 580. The final position 586 identifies the finishing position of a player, while the player name 588 field identifies the associated player by name (or other identifier). The display 580 may display a portion of the finishing order 586, or the entire finishing order of all participating players. The tournament award 590 field displays the number of tournament points or other awards accumulated or earned by a player in the respective tournament. The display 580 may be configured to display information about any facet of a tournament that is ongoing, has occurred or is going to occur. For example, the prize pool and the number of participants in an ongoing tournament may be displayed. Winning and results histories may also be displayed on the community display 580.

The community display 580 may be placed in any appropriate place within a casino or operator's facility, for example, a gaming room in a casino, the entry area of a casino, elevators of a casino, or any other public place inside or outside of a casino. Publicly displaying tournament information creates a community environment for tournament participants so as to incentive players to play in such available tournaments. Players may discuss their results or the results of others. Seeing and discussing the results of others may create an environment of friendly competition. This competition may spur some players to compete in more tournaments and new players to try tournament play. This environment of community and competition may also create player loyalty. It should be noted that the information provided on the community display may be limited or delayed as desired by a casino or tournament provider. For example, the high scores for a particular tournament may not be posted until after a tournament has been completed (as opposed to real-time tracking) to prevent players from "tournament shopping" and completing their entries only for tournaments with relatively low top scores.

Figure 6:
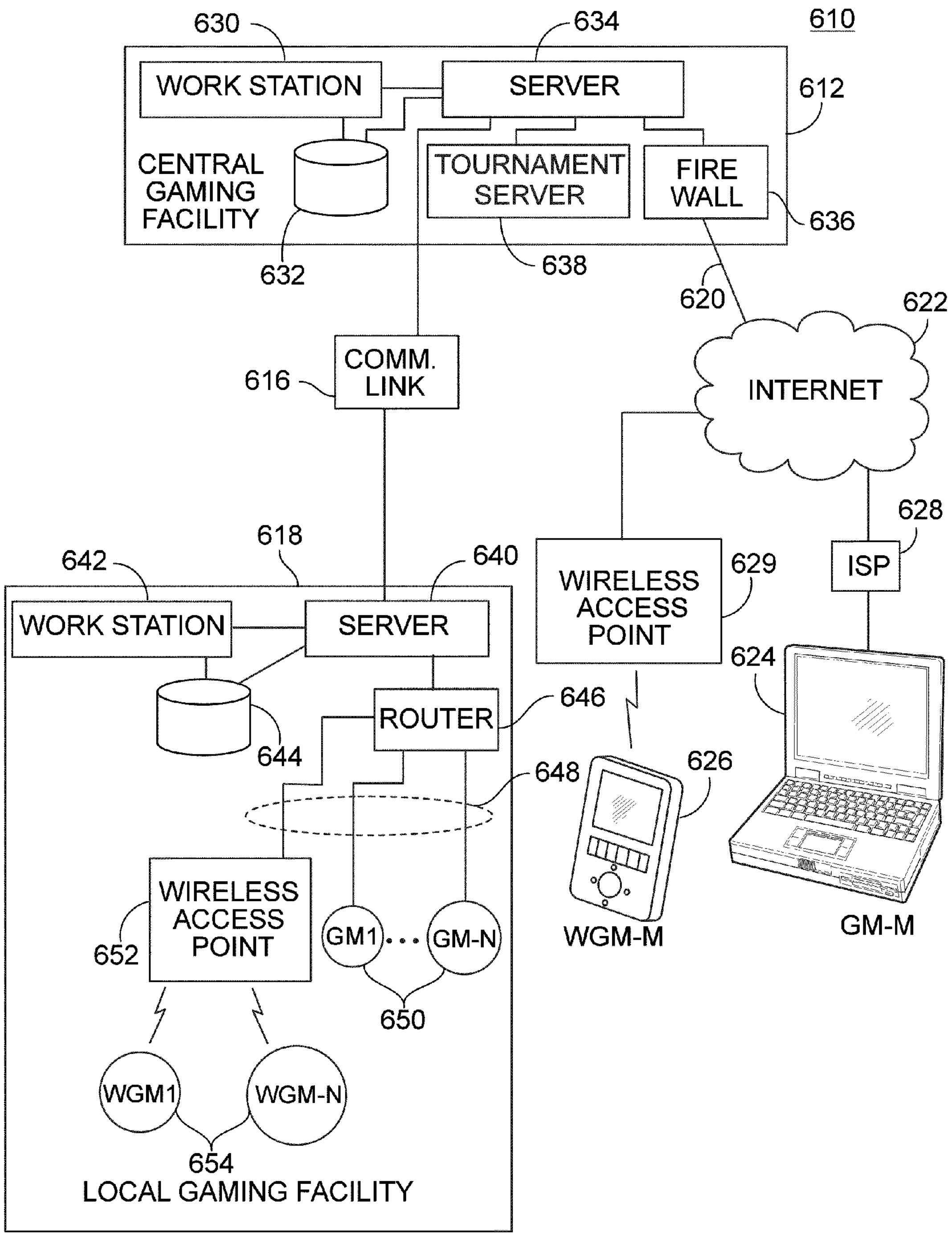
FIG. 6 is a diagram of an example gaming system including a tournament server for administering system wide tournament features funded by bonus awards.

Turning to FIG. 6, a diagram of an example gaming system 600 having system-wide tournament features funded by bonus awards is depicted. Shown in FIG. 6, is an exemplary gaming system 610 which includes a central gaming facility 612 connected by communication link 616 to a local gaming facility 618 (e.g., a casino) and by link 620 with the internet 622. End-user computing devices including a gaming machine or terminal GM-M 624 (e.g., a laptop computer) and wireless gaming machine or terminal WGM-M 626 (e.g., a personal digital assistant (PDA)) function as clients of the central gaming facility 612. Laptop 624 is coupled via internet service provider 628 and the internet 622 with the central gaming facility 612. The PDA 626 is connected with a wireless link by the wireless access point 629 and internet 622 to the central gaming facility 612. As used herein, "gaming" refers to the use of various games that support the placing of wagers on the outcome of the games (e.g., a video poker machine).

The central gaming facility 612 may represent a control location of a gaming business operator that supports individual gaming users (e.g., users of PDA 626 and laptop 624) as well as other gaming facilities of the operator such as casino 618. The central gaming facility 612 in this illustrative example may be geographically separated from the casino 618 and the individual users. The central gaming facility 612 includes a workstation 630 supported by data storage element 632 and a server 634 that serves as a communication host for casino 618 and the individual users via a firewall 636. Requests for information and/or data received from the individual users are processed by the server 634. The requested information and/or data may be obtained from support resources (e.g., workstation 630) and data residing in storage element 632. The requested information is sent from the server 634 to the requesting user's device(s).

The local gaming facility 618 represents a casino and includes a server 640 supported by a workstation 642, data storage element 644, and a router 646. The router 646 supports communications with different gaming machines or terminals GM(1)-GM(N) 650 by wired links 648. A wireless access point 652 is connected by a wired link 648 to router 646 and by wireless communication links to wireless gaming machines or terminals WGM(1)-WGM(N) 654.

At least some of the gaming machines 650 and some of the wireless gaming machines 654 support the play of wagering games in which the user's gaming machine functions in the client/server communication model with the user's gaming machine being a client of server 640. The user's gaming machine contains software which is responsible for the ongoing play of the wagering game. However, some information or data associated with the play of the game may be obtained during the ongoing play of the game from server 640. Thus, the gaming system 610 displayed and described may be configured to execute and display a variety of primary wagering games and community or progressive wagering games on the terminals [GM(1)-GM(N) 650, WGM(1)-WGM (N) 654, GM-M 624, and WM-M 626], as explained further herein.

As seen in FIG. 6, the central gaming facility 614 may also include a dedicated tournament server 638. The tournament server 638 may be separate from or integrated with the server 634, or other servers of the facility 612. The tournament server 638 and/or workstation 630 include software which operates to control, manage, execute, and operate the available tournaments as described herein. For example, such software may log in users to the system, detect and catalog their entries into various tournaments, collect all tournament entries for a particular tournament, create results based upon such entries, award awards in accordance with rule sets relating to finishing order in the tournament(s), and track player's progress through various tournaments. The tournament server 638, for example, may permit players to access a player history file or profile to see past tournaments in which they competed, past results, etc. The tournament server 638 may provide access to players within a casino or gaming facility over link 616, or may otherwise provide access to players remote from the gaming facility, for example over a home or mobile computer via link 620. It should further be understood that any of the functions described herein as relating to the central gaming facility 612 may alternatively or additionally be performed at the local gaming facility 618, or by any computer or server in communication therewith.

Figure 7:
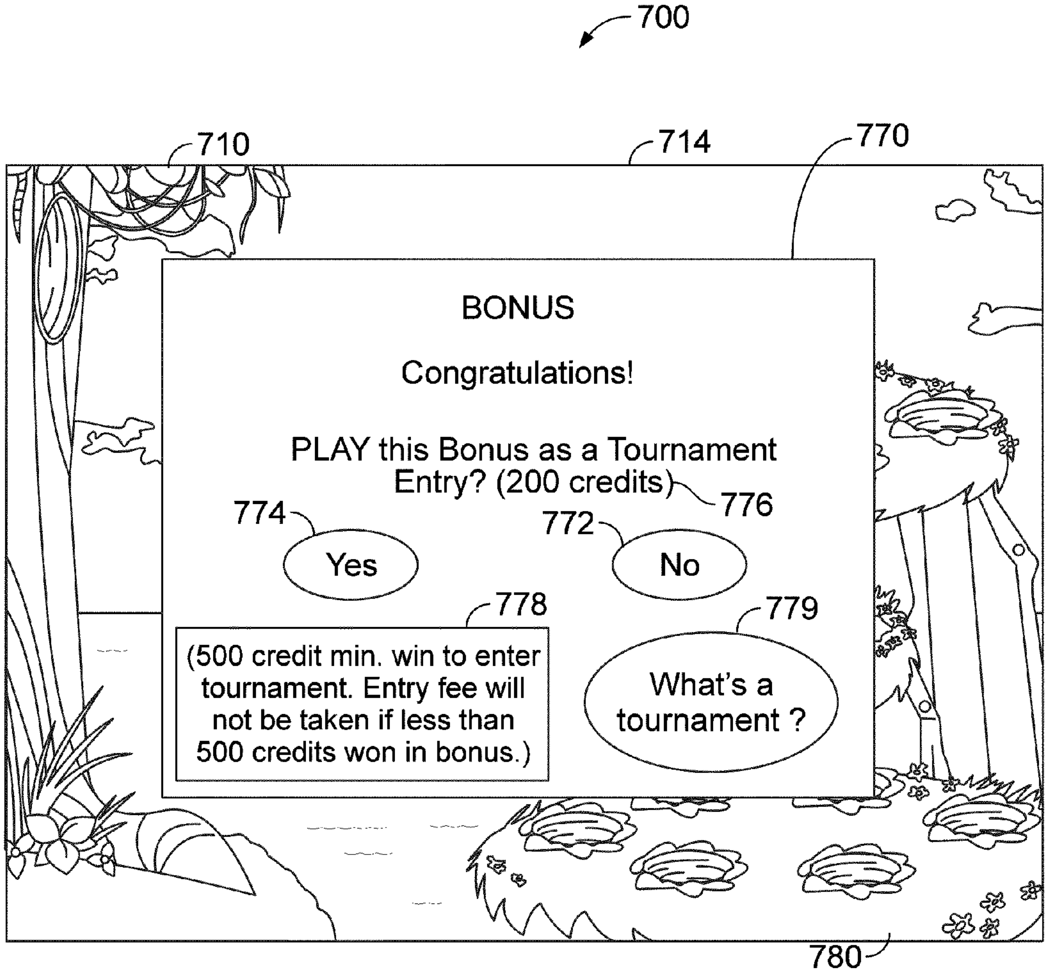
FIG. 7 is an image of a primary display of a gaming device in which a player is prompted to select operation of the bonus event on the gaming device in either a standard cash bonus mode or a tournament bonus mode.

Turning to FIG. 7, a primary display 714 of a gaming terminal 710 of a gaming system 700 is displayed, depicted after the occurrence of a triggering event in which a bonus or secondary wagering game 780 is triggered. In an embodiment, the bonus game 780 is triggered in response to an outcome in a primary wagering game, for example, a certain outcome of symbols in a slot game. In other embodiments, various triggering events may be used to trigger the bonus game 780. As seen in FIG. 7, a pop up window 770 is displayed overlying a start screen of the bonus game 780. The pop up window 770 contains information which is relayed to the player relevant to a choice the player must make regarding how the bonus game 780 and results therefrom will be played out and applied.

In an embodiment, as seen in FIG. 7, the pop up window 782 further includes a plurality of game configuration selections 772,774, and a player prompt to select between the selections 772,774. The player is prompted by the question "Play this Bonus as a Tournament Entry?" and is asked to select between the two configuration selections 772,774. A first game configuration selection 772 activated by a "No" button corresponds with a standard cash bonus mode, as described further herein. A second game configuration selection 774 activated by a "Yes" button corresponds with a tournament play bonus mode, as described further herein. Thus, one or more gaming devices or terminals 710 in the gaming system 700 is configured to operate bonus events 780 in either a standard cash bonus mode or a tournament bonus mode. In some embodiments, the choice of which bonus mode to operate is left to the player and is made via player selection as described. In other embodiments, the selection of which bonus mode to operate in may be random, or dependent upon operator selection, criteria, or rule sets.

When the "No" button 772 is selected, the gaming terminal 710 operates in a standard bonus mode, which is a normal or non-tournament mode. In the standard bonus mode, the bonus event 780 commences and is executed in standard fashion. For example, in some embodiments a player is granted a plurality of selections of selectable elements, or alternatively a plurality of free spins of a slot reel game. Awards and credits accumulated by the player in the bonus game are paid to the player upon conclusion of the bonus event 780. When playing in standard bonus mode, the bonus game 780 is configured to operate with a predetermined theoretical return (payback percentage) or expected value. For example, in one embodiment, the bonus game return is 90%.

When the "Yes" button 774 is selected, the gaming system 700 operates the bonus game 780 in a tournament bonus mode. In tournament bonus mode, the player elects to have his resulting performance in the bonus event 780 entered into one or more tournaments in the form of a tournament score. Thus, in one embodiment, the player forgoes receiving a portion of the cash value of awards earned in the upcoming bonus game 780 (by paying a tournament fee), and elects to have the results of such bonus game 780 entered into one or more tournaments as a "tournament score" to compete against other players who desire to do the same. The tournament bonus mode allows a player to visually play and experience the bonus game 780 in the same fashion as he would in standard bonus mode. However, upon conclusion of the bonus game 780, the credit award accumulated therein would constitute and form a tournament score for the player which is entered into one or more tournaments as described herein.

Thus, for example, after selecting the tournament bonus mode of operation with the "Yes" selection 774, the player would proceed to participate in the bonus game 780. Suppose the player earns awards totaling 875 credits in the bonus game 780 (e.g., by making selections from a pick field and receiving awards associated with the selectable elements). The player is awarded the 875 credits, but is additionally entered into at least one tournament with a tournament score of 875 points so as to compete against other players and their entered. Thus, the accumulated credits comprise a tournament score for the player which is then entered into one or more tournaments as described further herein with reference to FIG. 9. In an alternative embodiment, the player's tournament score or tournament points are derived by converting the player's accumulated bonus award credit score into a tournament score using a normalization or handicapping process, as explained with reference to FIG. 10. Thus, in some embodiments, a player's tournament score is derived by cross referencing a tournament score derivation table (e.g., see FIG. 10) using the player's accumulated bonus award credit score. The appearance of the bonus event 780 in tournament bonus mode may be similar or even identical to the appearance of the bonus event 780 in standard bonus mode. However, in tournament bonus mode, the result of the player's achievements in the bonus event 780 are entered into a competition with other players in the form of a tournament.

The pop up window 770 further includes a cost display 776 and an information display 778. The cost display 776 informs the player as to a cost of a tournament fee associated with playing the triggered bonus event 780 in a tournament bonus mode. The tournaments in which bonus-event generated tournament scores are entered into are funded in various ways. As seen in FIG. 7, in one embodiment, the player may have to pay a tournament fee to be eligible to have the outcome of his bonus event 780 participate in a tournament. In the embodiment shown in FIG. 7, this additional tournament fee is 200 credits, as displayed by the cost display 776. Therefore, the player is informed that by selecting the "Yes" selection 774 to play the bonus event 780 in tournament bonus mode, an additional tournament fee of 200 credits will be debited from his credit meter or appropriate account balance. The player's payment of the 200 credit tournament fee, along with all other tournament participants' tournament fees, funds the awards provided in the tournament as described herein. In other embodiments, choosing to play the bonus event 780 in a tournament bonus mode, as described, is performed at no additional cost to the player, and may be funded by a casino operator, gaming manufacturer, sponsor, advertiser, or other source.

The information display 778 provides information to the player relevant to certain thresholds that must be met for the tournament mode to be executed or completed. For example, the information display 778 in FIG. 7 communicates to the player that there is a 500 credit minimum win needed to enter into the tournament. Thus, when a player selects "Yes" 774 to play his bonus event 780 as a tournament score in a tournament, he does so with the understanding that his tournament score achieved in the bonus event 780 will only be entered into the tournament if he achieves a certain minimum tournament score (in this case 500 credits). If the result of the player's play of the bonus event 780 meets or exceeds such minimum tournament score, the player is entered into the tournament as described. If not, the system reverts that player's play of the bonus event 780 to a standard cash bonus mode, and the player is paid out in cash or credit awards at the conclusion of the bonus event 780 in which he failed to meet the minimum tournament score, just as he would have had the bonus event 780 been played in standard bonus mode. Optionally, the player's tournament fee may be refunded if his tournament score fails to meet or exceed the minimum threshold. This minimum threshold mechanism serves to buffer potential disappointment in players who have decided to have the outcome of their bonus event 780 entered into an upcoming tournament. An optional help button 779 may also be displayed in the pop up window 770 which serves as a gateway to further help screens which a player may access to receive more detailed explanations as to tournament bonus mode functions and execution.

Figure 8:
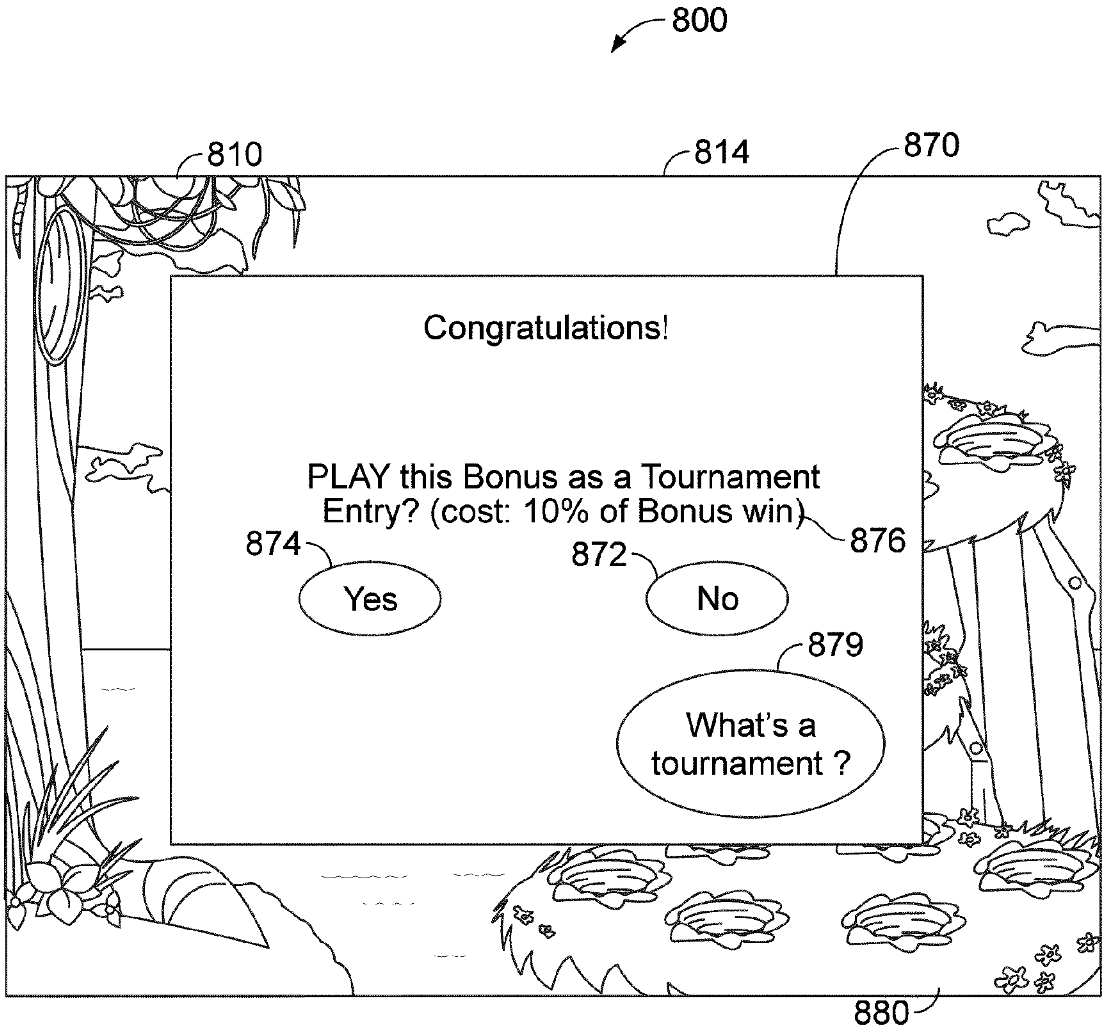
FIG. 8 is an image of an alternative embodiment of a primary display of a gaming device in which a player is prompted to select operation of the bonus event on the gaming device in either a standard cash bonus mode or a tournament bonus mode.

Turning to FIG. 8, a slightly different embodiment of the present invention is displayed in which tournaments are funded in a different manner. Again, a primary display 814 of a gaming terminal 810 of a gaming system 800 is displayed, depicted after the occurrence of a triggering event in which a bonus or secondary wagering game 880 is triggered. As seen in FIG. 8, a pop up window 870 is displayed overlying a start screen of the bonus game 880. The pop up window 870 contains similar information about the bonus event and available operational modes as the embodiment displayed and described in FIG. 7. Again the player is prompted to select between two game configuration selections 872, 874, which correspond to a standard bonus mode 872 and a tournament bonus mode 874, as described. Also displayed is a cost display 876, which again informs the player of the amount and nature of the tournament fee. The pop up window also includes an optional help button 879.

In this embodiment, the tournament fee is dependent on the outcome achieved by the player in the bonus event 880. Thus, the cost display 876 informs the player that the tournament fee is "10% of Bonus win." Therefore, rather than a fixed cost (e.g., the 200 credit tournament fee in FIG. 7), the tournament fee in this embodiment is dependent upon the players performance in the bonus event 880. For example, if a player plays the bonus event 880 and achieves a score of 5500 credits, the tournament fee he is charged is 10%, or 550 credits, which again is deducted or debited from his credit meter or appropriate account balance. Therefore, in various embodiments, the tournament fee may be a flat fee, a percentage of bonus win amount or tournament score amount, or both.

It should be understood that in an embodiment, regardless of the player's choice of standard bonus mode or tournament bonus mode, their net expected return is the same. The tournament bonus mode, in an embodiment, provides greater volatility in that the player has the potential to receive a larger award than that earned in the bonus event 780,880 if he or she places high in the tournament results. However, the player also has the opportunity of winning little or nothing if he or she places poorly in the tournament results. The standard bonus mode provides less volatile results as the player will normally achieve some winning credit award as a result of his play of the bonus game 780,880. Thus, one aspect of the present invention is that it provides a player with an opportunity to control (to a degree) the volatility of his bonus game 780,880 playing experience.

Once a player has made an appropriate selection 774,874 to play the respective bonus event 780,880 in tournament bonus mode, the game 780,880 proceeds as normal. The player plays and participates in the bonus event 780,880 until it concludes and the player achieves an outcome or award therein. The outcome comprises a tournament score for the player which is entered into one or more tournaments. In the tournament, the player's tournament score is collected and logged, as are the tournament scores of other participating players in the tournament. Upon conclusion of a tournament execution period, the results of such tournament are displayed to the various players, for example, by a community display such as the one described with relation to FIG. 5. Players placing within a predetermined ranking of the tournament outcome are awarded awards corresponding thereto, while other players who place relatively lower are not awarded any awards. In an embodiment, the number of players receiving tournament bonus awards is dependent upon a total number of players participating in the tournament. Appropriate tournament fees are received from all participating players, either at the time their selection of mode is made, or upon conclusion of their bonus event 780,880. In this way, the tournament fees collected from the various players in the tournament fund the tournament and create the prize pool which is distributed amongst the players in the finishing order positions for which tournament awards are paid.

Figure 9:
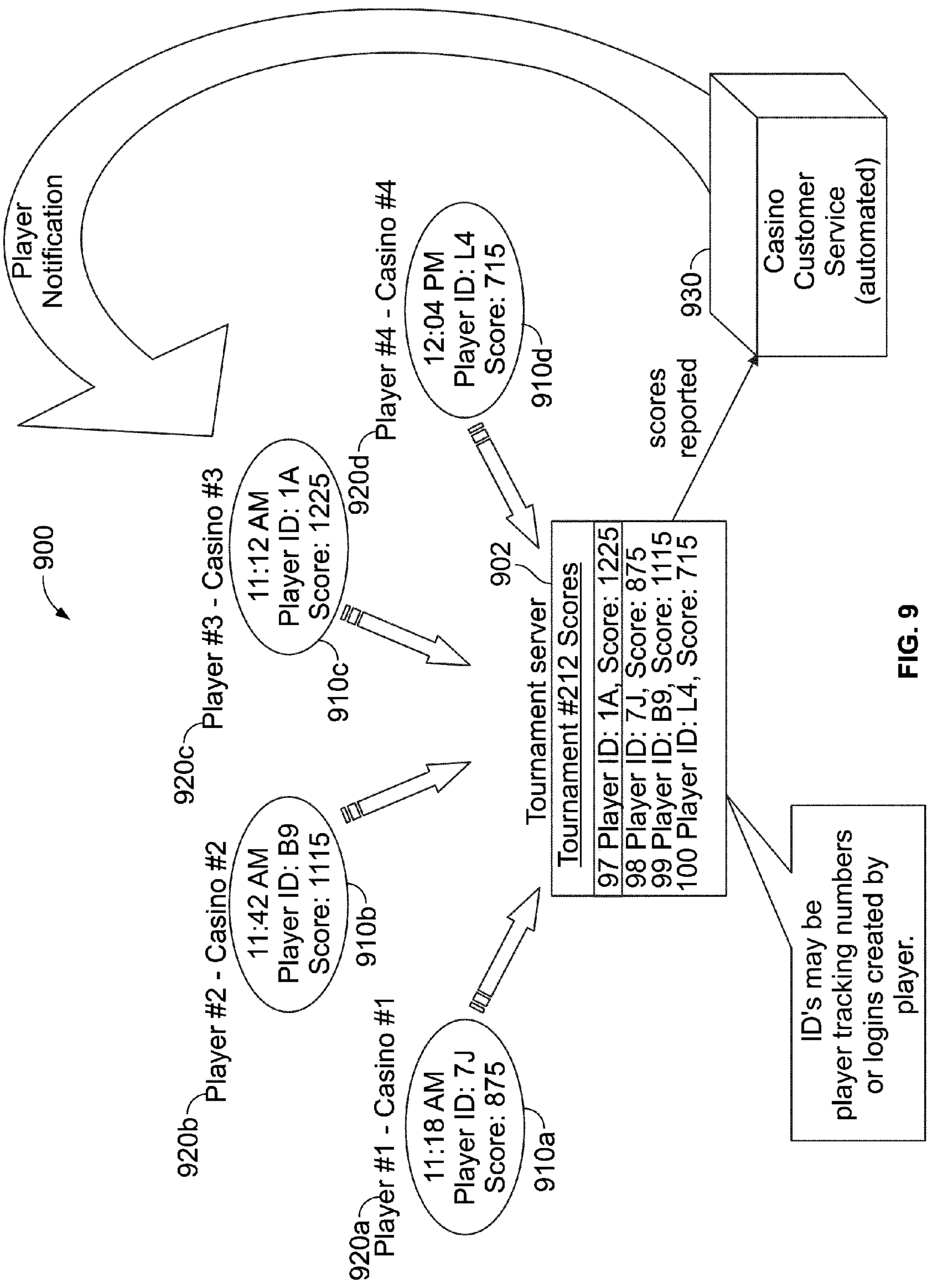
FIG. 9 is a diagram showing of operation of a gaming system having tournament features funded by bonus awards

Turning to FIG. 9, displayed is a flow chart and diagram of operation of a gaming system 900 having bonus awards entered into tournament features. A tournament server 902 is in communication with a plurality of gaming terminals 910*a-d* at which a plurality of players 920*a-d* are participating in wagering games. The players 920*a-d* at the terminals 910*a-d* have all triggered bonus events (albeit at different times), and opted to play such bonus events in tournament bonus mode, whereby their bonus outcomes act as tournament entries into a tournament administered by the tournament server 902. A first player 920*a* located in a first casino triggered a bonus event and played the event in tournament bonus mode. During the execution of such bonus event, the first player 920*a* achieved a score of 875 credits or "points", and has completed the bonus at 11:18 AM. The first player's 920*a* tournament score of 875 points is uploaded to the tournament server 902 which logs the player's tournament score and player identifier. Similarly, the other three players 920*b-d* have all completed bonus events for which they have selected tournament bonus mode operation. As a results, the other three players 920*b-d* have all generated tournament scores at various times, all of which are uploaded to the tournament server 902, along with each player's tournament score and player identifier. A second player 920*b* located in a second casino, generated a tournament score of 1115 points at 11:42 AM. A third player 920*c* located in a third casino, generated a tournament score of 1225 points at 11:12 AM. A fourth player 920*d*, located in a fourth casino, generated a tournament score of 715 points at 12:04 P.M.

As seen in FIG. 9, the tournament server 902 catalogs all player's tournament scores along with their associated player identifiers. Upon conclusion of a gaming session, no further tournament entries are accepted and the tournament is deemed "closed." In this embodiment, the tournament is a 100 player tournament which closes when the one hundredth player completes a bonus event and generates a tournament score uploaded to the server 902. In this case, the fourth player 920*d* with a score of 715 points is the last entry into the tournament. Once the tournament is closed and no more entries are being accepted, the tournament server 902 generates a ranking of players from the highest posted tournament score to the lowest. A number of players in the tournament are awarded prizes in accordance with the ranking. In some embodiments, a predetermined number of players are awarded prizes or awards. In other embodiments, the number of players awarded prizes or awards may be dependent on other factors, such as how many players participated in the tournament. As seen in FIG. 9, the player having the highest score is declared a winner of the tournament and provided with a first or grand prize. In this instance, the third player 920*c* posting a tournament score of 1225 credits is the winner of the tournament, and receives 5,000 credits. Thus, by participating in (and winning) the tournament, the third player has achieved a relatively large win of 5,000 credits in addition to the smaller 1225 credit win he received in the bonus event, however, the player paid a tournament fee of 200 credits to participate in the tournament. Had the same player not finished in a place in the finishing order for which tournament awards are paid, he would have only won the underlying 1225 credit win in the bonus event, less the 200 credit tournament fee, for a net of 1025 credits. Thus, by playing selecting tournament bonus mode operation, a player voluntarily gambles his tournament fee (in this case 200 credits), which the player may lose, or may parlay into a larger win.

Once the ranking is completed by the tournament server 902, scores and results are reported to other devices in the gaming system 900. For example, the tournament server 902 may utilize a Casino Customer Service facility 930 to distribute and publicize tournament results. The Casino Customer Service facility 930 may comprise a standalone or integrated computer, server, or other device, and may be in communication with one or more gaming terminals of the gaming system 900, as well as a variety of displays, other servers, computers, and peripherals. The results of the tournament may be reported to all of the players of the tournament at their local gaming terminals 910*a-d*. A variety of other player notification techniques may be used, including displaying results on community displays, mobile devices, email alerts, text messages, or history logs within a player account. Thus, the "Player Notification" aspect of FIG. 10 should be understood to include these and other methods of notifying the players (and perhaps non-participants as well) of the tournament results, either utilizing gaming system 900 components or external devices. In some embodiments, the Casino Customer Service facility 930 may be completely or partially automated so as to send out player notifications at appropriate intervals after tournaments are completed, or in response to other triggering events.

In accordance with some embodiments of the present invention, tournaments are based on a predetermined number of entries or players of bonus games 780,880—rather than traditional tournaments which are time based. Thus, for example, a tournament entry may comprise comparison of bonus game results for 100 players who have selected to have their bonus event 780,880 outcomes entered into a tournament and paid the requisite tournament fee. In some embodiments, after a player selects to play the bonus game 780,880 in tournament mode, he or she must then decide which tournament they will compete in (i.e. make a selection from available tournaments). Available tournaments may include a variety of different tournaments based upon time, number of players, etc. For example, the player may select between a 20 person tournament and a 2000 person tournament. Moreover, the player may select from various entry collection periods.

Thus, in an alternative embodiment, rather than having a fixed number of participants, tournaments are formed based upon all tournament scores collected in a certain time period, for example, an hour or a day (perhaps subject to a minimum number of tournament entries). The tournaments, for example, may include an Hourly tournament, a Daily tournament, a Monthly tournament, and a Yearly tournament. Each tournament is open or active for the period of time associated with the tournament. One or more information displays may be used to display the dates and/or times during which the tournaments remain open, as well as tournament status information such as number of entries and accumulated prize pool. In an example, the player selects the "Hourly" tournament which runs until the top of the hour. This means that the player has the remainder of the hour in which to complete his entry into the tournament (i.e. to trigger and play an appropriate bonus event 780,880 to form a tournament score for entry into the tournament).

In another embodiment, the player is entered into the appropriate tournament once his entry is completed. For example, a player selecting an HOURLY tournament begins his play of the bonus event 780,880. As explained, the total tournament score he achieves after completion of the bonus event 780,880 comprises his tournament score or entry. Assume the player commences play at 10:45 a.m. If he completes his tournament score (bonus event 780,880) prior to 11:00 a.m. (e.g., 10:52 a.m.), his tournament score is entered into the 10 AM-11 AM HOURLY tournament. If he takes a bit longer and completes his entry after 11:00 a.m. (e.g., 11:10 a.m.), his tournament score is entered into the 11 AM-12 Noon HOURLY tournament. Thus, in an embodiment, the player's completion time determines which tournament his score is entered into, and thus, which tournament(s) he participates in.

In various embodiments, the primary display 714,814 may include additional graphics, animation or indicia to indicate to the player that he has selected to play the bonus event 780,880 in tournament bonus mode. This may include additional information graphically displayed prior to, during, or after the bonus event 780,880 so as to emphasize the tournament bonus mode which the player has selected, and remind the player that the outcome of the bonus event 780,880 will not be paid out as a cash award, but rather entered into a tournament as a tournament score.

As described herein, in tournament bonus mode the player's outcome achieved in a bonus event 780,880 is paid as a cash award, as well as entered into a tournament in the form of a tournament score. In an alternative embodiment, the some or all of the player's outcome in the bonus event 780, 880 may be invested into a tournament in the form of the tournament score. For example, instead of or in addition to a tournament fee, the player may forego all or part of his earned credit award in the bonus event 780,880. Thus, instead of a relatively smaller tournament fee (e.g., 200 credits) funding the tournament, the larger bonus award from the bonus event 780,880 (e.g. 1225 credits) may be used to fund the tournament. In such a configuration, the tournament awards can be expected to be much larger and create even a more volatile experience due to the player foregoing his bonus award and instead counting on winning or placing in the tournament and receiving a significantly higher tournament award.

When only a few players are involved in a tournament, player collusion could affect the tournament outcome. To ensure collusion does not affect a tournament outcome, a minimum number of participants may be required for a tournament to begin or run. In one embodiment, the minimum number of players is ten. If a tournament does not proceed due to insufficient number of entries, players that entered the cancelled tournament are refunded the expected value of their tournament entry, which in an embodiment is a refund of their tournament fee and payment in credits of their tournament score (earned during an appropriate bonus event 780,880). It should be understood that a player's completion of his or her entry into a tournament need not be accomplished at once, or even in one gaming session. In an embodiment, players may leave play of a gaming device and return at a later time to complete the remainder of their tournament entry. In some embodiments, it may be required that play(s) of a bonus event 780,880 comprising the tournament entry be completed during an active period for the tournament, for example, during the hour for an hourly tournament or by the end of the day for a daily tournament.

In an alternative embodiment, a tournament may have autoplay capabilities.

A player may set up autoplay capabilities from a kiosk, or via any other appropriate gaming terminal or computing device allowing the player to access his player profile. Once autoplay capabilities have been set up, the tournaments may be automatically played by the system, for example, even while the player is not at a casino. The player can remotely follow autoplay results on the Internet, or by accessing information through other gaming devices. This may also permit a player to set certain preferences such as "Always Play Bonuses as Tournaments" or "Never Play Bonuses as Tournaments." In the former situation, a player choosing to have all bonus event outcomes played in tournament bonus mode may have such preference stored and recalled when his player identifier is detected at a gaming terminal. In such a scenario, player selection screens such as FIGS. 7 and 8 may be omitted and tournament fees may be automatically debited.

In still another embodiment, the tournament is played over an entire jurisdiction, with entries being made jurisdiction wide. This may entail players entering a tournament from different casinos, as seen in the example in FIG. 9. Alternatively, players may enter a tournament at a KIOSK or other remote locations and either autoplay the tournament, or play the tournament at a casino at a later time. A player may additionally enter a tournament on-line. Regardless of the method a player chooses to enter a tournament, scores are maintained on a computer of the gaming system, for example the tournament server of FIG. 10. The player may monitor tournament results remotely using the Internet or other means of remote communication. The capabilities of the system may vary based upon the components and configurations of the hardware and software therein.

In yet another alternative embodiment, the methods and systems of the tournament may be applied to video poker tournaments. Thus a video poker player may compete against other video poker players with scores maintained on a computer or network of computers. The system may be configured such that poker based bonus events 780,880 contribute tournament scores which are uploaded into poker style tournament events executed as described herein. The player may monitor tournament results remotely using the Internet or through other means of remote communication.

In an embodiment, the gaming system performs a handicapping or normalization process to ensure fairness amongst participants in tournaments who are playing different bonus events. For example, a player playing a first bonus wagering game having a range of possible awards between 100 and 1000 credits is unfairly prejudiced vis-à-vis a player playing a second bonus wagering game having a range of possible awards between 300 and 3000 credits. As can be seen, on average, the player of the second bonus wagering game will earn higher scores and receive an unfair advantage as those awards are entered into bonus tournaments in the form of tournament scores. Thus, the gaming system may employ a variety of tools to handicap or normalize tournament scores and thereby ensure fairness. In one embodiment, each player's bonus credit awards accumulated in a bonus event is converted to a standardized or normalized number of "tournament points" which are then entered into a subsequent tournament, as described herein.

Turning to FIG. 10, a tournament score derivation table 1004 is depicted. The derivation table 1004 may be used to handicap or normalize the tournament points awarded during play of two different bonus games. Because different bonus games have different pay tables, configurations, and awarding schemes, one or more tournament score derivation tables may be used to equalize the number of tournament points earned for a bonus event outcome in each such bonus wagering game. Thus, for example, shown in the table 1004 are two bonus games: "Zeus" and "Count Money." The Zeus game allows a player to accumulate a total amount of credits ranging from zero to 1500 credits. The Count Money game allows a player to accumulate a total amount of credits ranging from zero to 1200 credits. Therefore, the table 1004 breaks up the two bonus games into a plurality of ranges and associates each such range with a distinct tournament points score.

The derivation table 1004 contains tournament points awarded for a total number of credits earned during play of each bonus game. The top row 1006 of the table 1004 contains the heading title for each of the three columns 1008, 1010, 1012 of the table. A first heading title, "Tournament Points," heads the first column 1008. The entries contained in each row of the first column are the number of tournament points awarded for a particular bonus event total award. A second heading title, "Zeus," heads the second column 1010 of the table 1004. Entries contained in the second column 1010 are credit award ranges in the Zeus bonus game which have been configured to correspond to and be associated with the tournament points contained in the first column 1008. A third heading title, "Count Money," heads the third column 1012 of the table 1004. Entries contained in the third column 1012 are credit award ranges in the Count Money bonus game which have been configured to correspond to and be associated with the tournament points contained in the first column 1008.

As can be seen in FIG. 10, the Count Money game generally is a less volatile game than the Zeus game. Bonus games can have many different types of probability distributions that determine the size and frequency of wins. Equalization is desirable to ensure that a player playing the Zeus game is not unfairly competing in tournaments offered by the gaming system, vis-à-vis the player playing the Count Money game, and vice versa. Therefore, the entire credit award range of each game is broken down into ranges which correspond with a distinct set of tournament points 1008 available. For example, a player playing the Count Money bonus game and achieving a one hundred thirty five (135) credit bonus win is awarded twenty (20) tournament points on that play of the game, in accordance with the table 1004. However, a player playing the Zeus game and achieving a one hundred thirty five (135) credit bonus win is awarded thirty (30) tournament points on that play of the game, in accordance with the table 1004. Thus, because the bonus games have different ranges of credit awards available, each of the games' ranges are broken down differently in the table 1004 when associated or converted to tournament points, to ensure fairness and uniformity to players earning tournament points.

In the example, the less volatile Count Money bonus game earns more tournament points for the lower and higher credit amounts than the more volatile Zeus game. However, the Zeus bonus game earns more tournament points for the middle credit amounts than the Count Money bonus game. In this way, the tournament derivation table 1004 operates as a handicapping system to generate earned tournament points based upon a credit win's relative position in the range of available credit wins for a particular game. This creates a substantially equal chance for all players in winning a tournament based upon their entry collected regardless of which primary wagering game they played. In one embodiment, the tournament derivation table 1004 contains a column for each bonus wagering game offered in the casino or operator's facility (or otherwise eligible for participation in such tournaments) such that all such games can be equalized and cross referenced for generation of corresponding tournament points on winning spins or outcomes.

Figure 11:
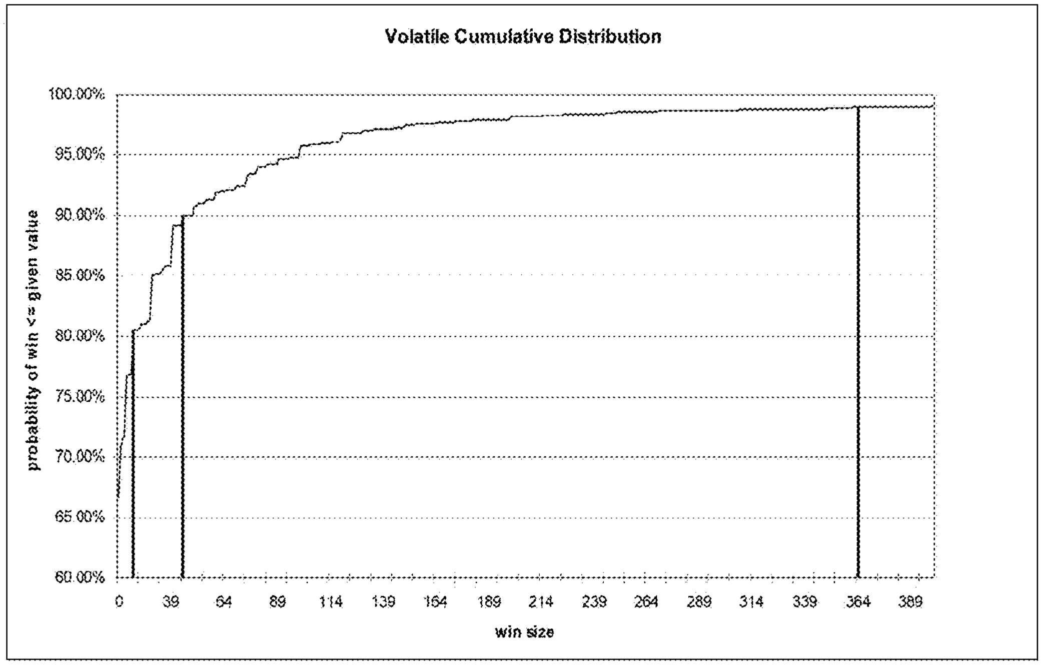
FIG. 11 is illustrates a cumulative distribution for a hypothetical volatile bonus game.
Figure 12:
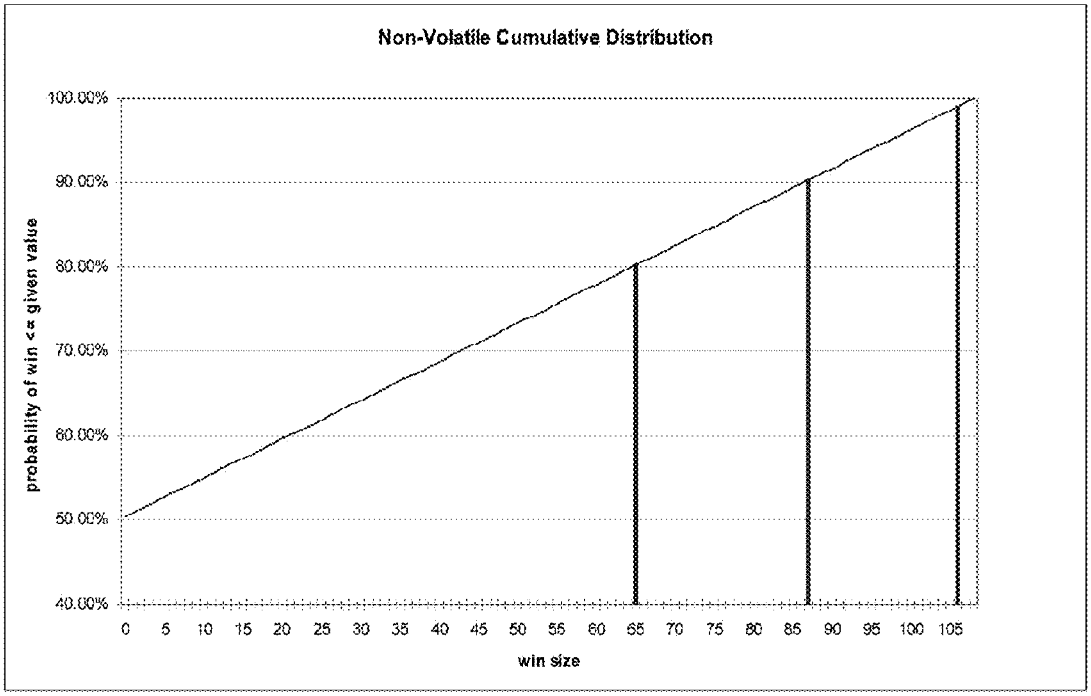
FIG. 12 illustrates a cumulative distribution for a hypothetical non-volatile bonus game.

The tournament points to credit value association can be further understood with respect to FIGS. 11, 12 and Table 1 below. FIG. 11 illustrates a cumulative distribution for a hypothetical volatile bonus game while FIG. 12 illustrates a cumulative distribution for a hypothetical non-volatile bonus game. As can be seen in both FIG. 11 and FIG. 12, the Y axis represents the likelihood of a win occurring and the X axis represents the win size. Thus, as can be seen, the higher the win size, the less the likelihood of such a win occurring. For example, with respect to FIG. 12, a winning outcome should occur 50% of the time, but only 5% of the time will an outcome exceed 106 credits. By analyzing and sub-dividing the cumulative distributions for various bonus games, a tournament scoring system can be implemented that equalizes various bonus games and does not provide an advantage to any player regardless of which bonus game the player chooses to play.

Table 1 provides a possible tournament points schedule with respect to the above-provided cumulative distributions.

TABLE 1

| Tournament Points | Volatile | Non-Volatile |
|---|---|---|
| 1 | 0-19 | 0-64 |
| 2 | 20-44 | 65-86 |
| 3 | 45-364 | 87-105 |
| 4 | ≧365 | ≧106 |

Each of the cumulative distributions in FIGS. 11 and 12 are divided into quartiles (though any distribution could be divided into any number of sections), and each quartile is then associated with a number of tournament points. For example, in both the non-volatile and volatile game, a player receives a single tournament point for 80% of the plays of a bonus game. However, the credit values associated with that one point varies. In the volatile bonus game, a win of 19 credits or less occurs 80% of the time whereas in the non-volatile bonus game, a win of 64 credits or less occurs 80% of the time. Thus, even though the players are winning different credit amounts with respect to the bonus game they are playing, their tournament points and scoring have been equalized across various games. The method for equalizing various wagering games is more fully detailed below.

Referring again to FIG. 10, in looking at the mathematics behind constructing the Tournament Score Derivation Table

1004 it is worth noting that the possible outcomes of a bonus event form a discrete probability distribution. For each integer $k \geqq 0$, $p_k$ is defined as the probability that a play of a bonus game wins k credits, where:

$$p_0+p_1+p_2+\ldots=1$$

The cumulative distribution function F(n) may be defined as follows:

$$F(n)=p_0+p_1+\ldots+p_n$$

In other words, F(n) is the probability that a play of a bonus game pays less than or equal to n credits. We also define $F(-1)=-1$.

Suppose we wish set up a tournament such that each play of a bonus game awards N distinct levels of points $A_1, A_2, \ldots, A_N$ and the corresponding probabilities of being awarded these point levels are given by $q_1, q_2, \ldots, q_N$, respectively. We assume that $q_k>0$ for each $1 \leqq k \leqq N$ and $q_1+\ldots+q_N=1$. What follows is an algorithm using the cumulative distribution function to obtain a bonus award driven tournament with the desired properties.

Define the cumulative distribution function for $q_i$'s:

$$Q(0)=0$$

$$Q(k)=q_1+\ldots+q_k, 1 \leqq k \leqq N$$

Obtain N (uniquely determined) integers $0 \leqq n_1 \leqq n_2 \leqq \ldots \leqq n_N$ with the following properties for each $1 \leqq k \leqq N-1$:

$$F(n_k) \geqq Q(k)$$

$$F(n_{k-1})<Q(k)$$

In the previous two formulas $F(n_k)$ is the probability that a given play of a bonus game pays less than or equal to n credits. A $q_k$ of Q(k) is the probability of being awarded tournament points at less than or equal to the $k^{th}$ point level, where a point level corresponds to a row in the Tournament Score Derivation Table 1004. In other words, we are looking for an n such that the probability that a play of a bonus game pays less than or equal to n credits is greater than or equal to the probability of being awarded a tournament point level $k[F(n_k) \geqq Q(k)]$. And the probability that a play of a bonus game pays less than or equal to n−1 credits is less than the probability of being awarded a tournament point level k. In looking at the Zeus column 1010 of the Tournament Score Derivation Table 1004, $n_1$ is 44, $n_2$ is 94, $n_3$ is 129, $n_4$ is 361, etc. As to tournament point levels associated with the Zeus game, $q_1$ is 0, $q_2$ is 10, etc.

If $F(n_k)=Q(k)$ for each k, then the following award schedule has the desired properties. Let S be the number of credits won during a play of a bonus game. Award tournament points according to the following formula:

$$A_1 \text{ if } S \leqq n_1$$

$$A_k \text{ if } n_{k-1}<S \leqq n_k \text{ and } 2 \leqq k \leqq N-1$$

$$A_n \text{ if } S>n_{N-1}$$

In relating the previous formulas to the Tournament Score Derivation Table 1004, $A_1$ corresponds to an award of 0 tournament points, $A_2$ corresponds to an award of ten tournament points, etc. Thus a player playing the Zeus game in a tournament is awarded point level $A_1$, which corresponds to zero points, if the number of credits won during a play of a bonus game (S) is less than or equal to 44 (n1). A player is awarded point level $A_2$ if the number credits won during a spin (S) is greater than 44 ($n_1$) and less than or equal to 94 ($n_2$) where k is always greater or equal to 2.

The discrete nature of a bonus game distribution means that the condition $F(n_k)=Q(k)$ will not always be satisfied. This can be handled by means of a "tournament booster." The player is awarded tournament points according to the above formula. On random plays of the bonus game, additional tournament points will be awarded. This is to assure that the probability a player is awarded $A_k$ tournament points is exactly $q_k$ In this way, in some embodiments, a tournament points normalization or equalization process is used to place players of different bonus games on equal footing when generating a tournament score for each player to be used in a tournament. In other embodiments, the normalization process is not necessary, for example, when all players are playing the same bonus game, or bonus games having identical volatilities.

The gaming system and methods of the present invention offer a number of benefits to players and operators. Players are given a certain control over the volatility of their gaming experience by being permitted to enter their bonus event outcomes into tournaments for the possibility of earning significantly larger awards. This option provides players with a gambling mechanism, while maintaining the look and feel of the bonus events as played in standard format. Other benefits are provided as well.

Each of these embodiments and obvious variations thereof is contemplated as falling within the spirit and scope of the claimed invention, which is set forth in the following claims.

What is claimed is:

1. A gaming system for conducting a wagering game including a multi-mode bonus event, the gaming system comprising:

- at least one input device;
- one or more display devices for displaying a primary wagering game and a bonus event;
- one or more processors; and
- at least one memory device storing instructions that, when executed by the gaming system, cause the gaming system to:
  - receive a wager from a player initiating the primary wagering game;
  - initiate the bonus event in response to an occurrence of a triggering event during play of the primary wagering game;
  - prior to initiating the bonus event, detect a selection, by the player, of one of a standard bonus mode of operation and a tournament bonus mode of operation, wherein the selection is independent of the bonus event;
  - execute the bonus event and display a bonus winning outcome of the bonus event;
  - if the standard bonus mode is selected, provide any awards associated with the bonus winning outcome to the player; and
  - if the tournament bonus mode is selected, generate a tournament score corresponding to the bonus winning outcome, and enter the tournament score into at least one tournament event.

2. The gaming system of claim 1, wherein the gaming system further collects a tournament fee from the player in response to the tournament bonus mode being selected.

3. The gaming system of claim 2, wherein the amount of the tournament fee is dependent upon the tournament score generated in the bonus event.

4. The gaming system of claim 1, wherein the tournament score comprises an amount of points equal to a credit amount which would have been provided had the standard bonus mode been selected.

5. The gaming system of claim 1, wherein entry into the tournament event is closed after a predetermined number of tournament scores are entered.

6. The gaming system of claim 1, wherein entry into the tournament event is closed after expiration of a predetermined period of time.

7. The gaming system of claim 1, wherein the tournament score equals a total credit amount earned by the player in the bonus event.

8. The gaming system of claim 1, wherein the tournament score is derived by cross-referencing a total credit amount earned by the player in the bonus event in a tournament points derivation table.

9. The gaming system of claim 1, wherein the tournament score is calculated based upon a total credit amount earned by the player in the bonus event and a volatility of the bonus event.

10. A computer-implemented method of conducting a wagering game including a multi-mode bonus event-, the method comprising:

- receiving, via at least one input device, a wager from a player to initiate a primary wagering game;
- displaying, on one or more display devices, images representing game-play of the primary wagering game;
- initiating, via one or more processors, the bonus event in response to an occurrence of a triggering event during play of the primary wagering game;
- prior to initiating the bonus event, detecting a selection, by the player, of one of a standard bonus mode of operation and a tournament bonus mode of operation, wherein the selection is independent of the bonus event;
- executing, via the one or more processors, the bonus event and displaying, on the one or more display devices, a bonus winning outcome of the bonus event;
- if the standard bonus mode is selected, providing any awards associated with the bonus winning outcome to the player;
- if the tournament bonus mode is selected, generating a tournament score corresponding to the bonus winning outcome for the player; and
- entering the tournament score into at least one tournament event.

11. The method of claim 10, further comprising collecting a tournament fee from the player in response to the tournament bonus mode being selected.

12. The method of claim 11, wherein the tournament fee comprises a predetermined number of credits.

13. The method of claim 11, wherein the tournament fee corresponds to a percentage of the tournament score.

14. A computer-implemented method of executing a wagering game including a multi-mode bonus event, the method comprising:

- receiving, via at least one input device, a wager from a player to initiate a primary wagering game;
- displaying, on one or more display devices, images representing game-play of the primary wagering game;
- initiating, via one or more processors, a first bonus event in response to an occurrence of a triggering event during play of the primary wagering game;
- prior to initiating the bonus event, detecting a selection, by the player, of one of a standard bonus mode of operation and a tournament bonus mode of operation, wherein the selection is independent of the bonus event;
- executing, via the one or more processors, the first bonus event and displaying a bonus winning outcome of the first bonus event;

in response to the selection of the standard bonus mode of operation, providing any awards associated with the bonus winning outcome to the player;

in response to the selection of the tournament bonus mode of operation, generating a normalized tournament score corresponding to the bonus winning outcome of the first bonus event; and entering the normalized tournament score into a tournament event with one or more other normalized tournament scores from at least one different bonus event, the normalized tournament scores being adjusted to compensate for one or more differences between the first bonus event and the at least one different bonus event.

15. The method of claim 14, further comprising providing a tournament award to a player having the highest normalized tournament score.

16. The method of claim 14, wherein a normalized tournament score is derived by cross-referencing a total credit amount earned by the player in the bonus event in a tournament points derivation table.

17. The method of claim 14, wherein a normalized tournament score is normalized by dividing the awards associated with the bonus winning outcome into a plurality of award amount ranges, wherein each award amount range corresponds to a different normalized tournament score.

18. The method of claim 14, wherein a normalized tournament score is adjusted based on a volatility of a corresponding bonus event.

19. The method of claim 14, wherein a normalized tournament score from a low volatility bonus event is adjusted upwards.

20. The method of claim 14, wherein a normalized tournament score from a high volatility bonus event is adjusted downwards.

21. A machine-readable, non-transitory medium including executable instructions that, when executed by a gaming system, cause the gaming system to perform a method comprising:

receiving, via at least one input device, a wager from a player to initiate a primary wagering game;

displaying, on one or more display devices, images representing game-play of the primary wagering game;

initiating, via one or more processors, a bonus event in response to an occurrence of a triggering event during play of the primary wagering game;

prior to initiating the bonus event, detecting a selection, by the player, of one of a standard bonus mode of operation and a tournament bonus mode of operation, wherein the selection is independent of the bonus event;

executing, via the one or more processors, the bonus event and displaying, on the one or more display devices, a bonus winning outcome of the bonus event;

if the standard bonus mode is selected, providing any awards associated with the bonus winning outcome to the player;

if the tournament bonus mode is selected, generating a tournament score corresponding to the bonus winning outcome for the player; and entering the tournament score into at least one tournament event.

22. The medium of claim 21, wherein a net expected return to the player is the same in the standard bonus mode and in the tournament bonus mode.

23. The medium of claim 21, wherein entries to the at least one tournament event includes tournament scores generated within a predetermined time period.

24. The medium of claim 21, wherein the gaming system includes a plurality of gaming terminals, and tournament scores entered in the tournament event are from bonus events executed on gaming terminals of the plurality.

25. The medium of claim 23, wherein the gaming system further comprises a community display device displaying the tournament event including prize and award information related to the tournament event.

* * * * *